(12) United States Patent
Minamiura

(10) Patent No.: US 10,011,188 B2
(45) Date of Patent: Jul. 3, 2018

(54) HYBRID VEHICLE

(71) Applicant: TOYOTA JIDOSHA KABUSHIKI KAISHA, Toyota-shi, Aichi-ken (JP)

(72) Inventor: Keiichi Minamiura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 15/212,348

(22) Filed: Jul. 18, 2016

(65) Prior Publication Data

US 2017/0028868 A1 Feb. 2, 2017

(30) Foreign Application Priority Data

Jul. 31, 2015 (JP) ................. 2015-151972

(51) Int. Cl.
*H02J 7/00* (2006.01)
*H02J 7/04* (2006.01)
*H02J 7/16* (2006.01)
*B60L 11/18* (2006.01)
*B60W 20/13* (2016.01)
*B60W 10/26* (2006.01)
*B60K 6/445* (2007.10)
*B60W 20/15* (2016.01)

(52) U.S. Cl.
CPC .......... *B60L 11/1862* (2013.01); *B60K 6/445* (2013.01); *B60L 11/1859* (2013.01); *B60L 11/1864* (2013.01); *B60W 10/26* (2013.01); *B60W 20/13* (2016.01); *B60W 20/15* (2016.01); *B60L 2210/10* (2013.01); *B60L 2240/545* (2013.01); *B60L 2240/547* (2013.01); *B60L 2260/44* (2013.01); *B60W 2510/242* (2013.01); *Y02T 10/6239* (2013.01); *Y02T 10/7005* (2013.01); *Y02T 10/705* (2013.01); *Y02T 10/7044* (2013.01); *Y10S 903/907* (2013.01)

(58) Field of Classification Search
CPC ....................................................... H02J 7/0029
USPC .................................................. 320/109, 149
See application file for complete search history.

(56) References Cited

U.S. PATENT DOCUMENTS

2003/0025479 A1* 2/2003 Kikuchi ............. G01R 31/3679
320/134

FOREIGN PATENT DOCUMENTS

JP 2003-047108 A 2/2003
JP 2011-225079 A 11/2011

* cited by examiner

*Primary Examiner* — Edward Tso
*Assistant Examiner* — Ahmed Omar
(74) *Attorney, Agent, or Firm* — Oliff PLC

(57) ABSTRACT

A hybrid vehicle includes an electronic control unit. The electronic control unit is configured to a) control operation of the power generation mechanism such that a state of charge of the secondary battery is kept at a predetermined control target; b) calculate an estimated actual state of charge of the secondary battery based on an integrated current value and a state of charge decrease amount due to self-discharge of the secondary battery, the integrated current value being obtained by integrating an input current and an output current of the secondary battery; and c) when the estimated actual state of charge has decreased below a predetermined first lower limit state of charge, raise the control target.

5 Claims, 12 Drawing Sheets

HYBRID VEHICLE

INCORPORATION BY REFERENCE

The disclosure of Japanese Patent Application No. 2015-151972 filed on Jul. 31, 2015 including the specification, drawings and abstract is incorporated herein by reference in its entirety.

BACKGROUND

1. Technical Field

The disclosure relates to a hybrid vehicle and, more particularly, to charge and discharge control over a secondary battery mounted on a hybrid vehicle while the hybrid vehicle is traveling.

2. Description of Related Art

A hybrid vehicle is able to charge a vehicle-mounted secondary battery by the use of power generation that accompanies engine operation even during traveling. For this reason, as described in Japanese Patent Application Publication No. 2011-225079 (JP 2011-225079 A), charging and discharging of a secondary battery are controlled by executing forcible discharge control or forcible charge control such that the state of charge (SOC) of the secondary battery is kept within a predetermined range. Particularly, JP 2011-225079 A describes control for changing a control center SOC in response to the number of times forcible charge control is executed and the number of times forcible discharge control is executed.

Japanese Patent Application Publication No. 2003-047108 (JP 2003-047108 A) describes that, when the charge memory effect of a secondary battery has been detected, the memory effect is eliminated while a decrease in vehicle performance and battery degradation are avoided by increasing a target SOC.

However, in the control described in JP 2011-225079 A, ordinary charge and discharge control is executed before forcible charging caused by an approach of the SOC to a control lower limit is actually performed a certain number of times. For this reason, it is not possible to sufficiently avoid occurrence of the memory effect, so there is a concern that charge and discharge control over the secondary battery is changed after the memory effect has occurred as in the case of JP 2003-047108 A.

SUMMARY

The disclosure provides a hybrid vehicle that controls charging and discharging of a secondary battery such that occurrence of a memory effect is prevented.

In an aspect of this disclosure, a hybrid vehicle includes a secondary battery, a drive mechanism, an internal combustion engine, a power generation mechanism and an electronic control unit. The drive mechanism is configured to generate driving force by using electric power from the secondary battery. The power generation mechanism is configured to generate electric power for charging the secondary battery by using power output from the internal combustion engine. The electronic control unit is configured to control operation of the power generation mechanism such that an SOC of the secondary battery is kept at a predetermined control target. The electronic control unit is configured to calculate an estimated actual SOC of the secondary battery based on an integrated current value and an SOC decrease amount due to self-discharge of the secondary battery. The integrated current value is obtained by integrating an input and output current of the secondary battery. The electronic control unit is configured to, when the calculated estimated actual SOC has decreased below a predetermined first lower limit SOC, raise the control target.

With the above hybrid vehicle, when the estimated actual SOC that reflects the SOC decrease amount due to self-discharge of the secondary battery, which cannot be acquired by integrating a current, has decreased, the control target of SOC control using the power generation mechanism is allowed to be raised. Therefore, it is possible to prevent occurrence of the charge memory effect of the secondary battery by preventing retention of an actual SOC in a low SOC range due to the influence of self-discharge.

The electronic control unit may be configured to calculate a control SOC based on the integrated current value, and, when the control SOC has decreased to a second lower limit SOC, forcibly charge the secondary battery by operating the power generation mechanism, the second lower limit SOC being higher than the first lower limit SOC. The electronic control unit may be further configured to, even when the estimated actual SOC has decreased below the first lower limit SOC, but when the number of times the secondary battery is forcibly charged is smaller than a predetermined number of times, prohibit raising the control target.

With this configuration, before forcible charging that is activated such that the control SOC does not decrease below the second lower limit SOC (S1) is performed the predetermined number of times, even when the estimated actual SOC has decreased to the lower limit SOC (Sx), raising of the SOC control target is prohibited. As a result, before a retention time in the low SOC range extends to a certain degree, it is possible to avoid a reduction in the amount of regenerated electric power recovered resulting from raising of the control target. As a result, it is possible to prevent or reduce a decrease in the energy efficiency of the hybrid vehicle.

The electronic control unit may be further configured to, when the hybrid vehicle has been left standing in a parking range for over a predetermined time and electric power consumed by an auxiliary load is larger than or equal to a predetermined value, raise the control target.

With this configuration, when the vehicle enters a vehicle state where there is a possibility of retention of the SOC in the low SOC range for an extended period of time, it is possible to preliminarily raise the SOC control target. Therefore, it is possible to further reliably prevent occurrence of the charge memory effect of the secondary battery.

According to this disclosure, it is possible to control charging and discharging of the secondary battery mounted on the hybrid vehicle during vehicle traveling such that occurrence of the memory effect of the secondary battery is prevented.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
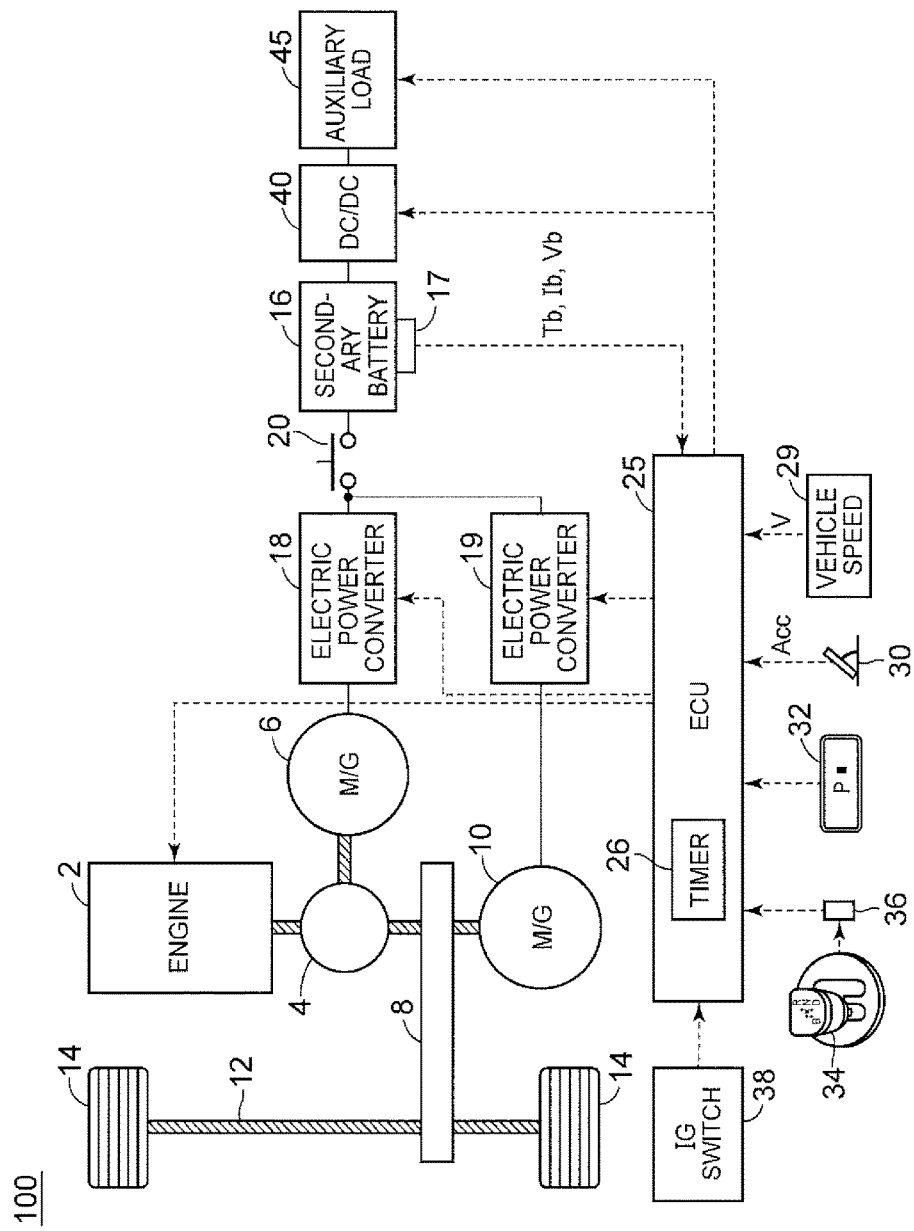
FIG. 1 is a block diagram for illustrating the overall configuration of a hybrid vehicle according to an embodiment of the disclosure.

Hereinafter, an embodiment of the disclosure will be described in detail with reference to the accompanying drawings. In the following description, like reference numerals denote the same or corresponding portions in the drawings, and the description thereof will not be repeated in principle.

FIG. 1 is a block diagram for illustrating the overall configuration of a hybrid vehicle 100 according to the embodiment of the disclosure.

As shown in FIG. 1, the hybrid vehicle 100 includes an engine 2, a power split device 4, motor generators 6, 10, a transmission gear 8, a drive shaft 12, and wheels 14. The hybrid vehicle 100 further includes a secondary battery 16, electric power converters 18, 19, an electronic control unit (ECU) 25, a vehicle speed sensor 29, an accelerator pedal 30, a parking switch 32, a shift lever 34, a shift position sensor 36 and an IG switch 38.

The engine 2 is an internal combustion engine that outputs power by converting thermal energy generated by combustion of fuel to the kinetic energy of moving components, such as a piston and a rotor.

Each of the motor generators 6, 10 is an alternating-current rotary electric machine, and is, for example, a three-phase alternating-current synchronous motor. The motor generator 6 is not only used as a generator that is driven by the engine 2 via the power split device 4 but also used as an electric motor for starting the engine 2.

The motor generator 10 mainly operates as an electric motor, and is used to drive the drive shaft 12 of the hybrid vehicle 100. On the other hand, during deceleration of the hybrid vehicle 100, the motor generator 10 operates as a generator to perform regenerative power generation.

The power split device 4, for example, includes a planetary gear train including three rotating elements, that is, a sun gear, a carrier and a ring gear. The power split device 4 splits the driving force of the engine 2 to power that is transmitted to the rotary shaft of the motor generator 6 and power that is transmitted to the transmission gear 8. The transmission gear 8 is coupled to the drive shaft 12 for driving the wheels 14. The transmission gear 8 is also coupled to the rotary shaft of the motor generator 10.

The secondary battery 16 is provided as a rechargeable direct-current power supply. In the present embodiment, the secondary battery 16 is formed of a nickel-metal hydride secondary battery. The secondary battery 16 is connected to the electric power converters 18, 19 via a system main relay (SMR) 20.

A DC/DC converter 40 is arranged in order to generate the power supply voltage of an auxiliary load 45 by stepping down the output voltage of the secondary battery 16. That is, when the DC/DC converter 40 operates, the auxiliary load 45 is operable by using electric power from the secondary battery 16.

The SMR 20 is turned on when the IG switch 38 is turned on by a driver. Thus, the hybrid vehicle 100 enters a travelable state. On the other hand, when the IG switch 38 is turned off by the driver, the SMR 20 is turned off. When the SMR 20 is turned off, vehicle traveling using the electric power of the secondary battery 16 is disabled. Hereinafter, the time when the SMR 20 is in the off state is also referred to as when the secondary battery 16 is not used (or when the secondary battery 16 is left standing). However, as is understood from the configuration of FIG. 1, even when the SMR 20 is in the off state, that is, the secondary battery 16 is not used, the auxiliary load 45 is operable by using the electric power of the secondary battery 16.

When the SMR 20 is in the on state, the electric power converter 18 bidirectionally performs direct-current/alternating-current power conversion between the motor generator 6 and the secondary battery 16 based on a control signal that is received from the ECU 25. Similarly, when the SMR 20 is in the on state, the electric power converter 19 bidirectionally performs direct-current/alternating-current power conversion between the motor generator 10 and the secondary battery 16 based on a control signal that is received from the ECU 25.

Thus, each of the motor generators 6, 10 is able to output positive torque for operating as an electric motor or negative torque for operating as a generator as a result of exchanging electric power with the secondary battery 16. A step-up converter for direct-current voltage conversion may be arranged between the secondary battery 16 and each of the electric power converters 18, 19.

The motor generator 6 is able to constitute a power generation mechanism because the motor generator 6 has a generator operation mode for generating electric power for charging the secondary battery 16 by using power output from the engine 2 and transmitted via the power split device 4. The motor generator 10 is able to implement a drive mechanism for generating vehicle driving force by using electric power from the secondary battery 16 when the motor generator 10 operates as an electric motor by using electric power from the secondary battery 16.

A sensor unit 17 is arranged in the secondary battery 16. The sensor unit 17 is used to detect an output voltage Vb (hereinafter, also referred to as battery voltage Vb), an input/output current Ib (hereinafter, also referred to as battery current Ib) and a temperature Tb (hereinafter, also referred to as battery temperature Tb). The battery voltage Vb, battery current Ib and battery temperature Tb detected by the sensor unit 17 are transmitted to the ECU 25.

The ECU 25 includes a central processing unit (CPU), a storage device, an input/output buffer, and the like (all of which are not shown), and controls devices in the hybrid vehicle 100. These controls are not limited to software processing. These controls may be processed by exclusive hardware (electronic circuit). The ECU 25 includes a timer 26 for measuring a time.

An output signal of the shift position sensor 36 and an operation signal of the parking switch 32 are further input to the ECU 25. The driver is allowed to select any one of a reverse position (R position), a neutral position (N position), a drive position (D position) and a brake position (B position) by operating the shift lever 34. The output signal of the shift position sensor 36 indicates the shift position that has been currently selected through operation of the shift lever 34.

The driver is allowed to select a P position by operating (pressing) the parking switch 32 for selecting the parking position (P position) through one-touch operation. In accordance with driver's selection of the shift position, the shift range of the hybrid vehicle 100 is selected to a reverse range (R range), a neutral range (N range), a drive range (D range), a brake range (B range) or a parking range (P range). When the P range is selected, the rotation of the drive shaft 12 is locked by activating a parking lock mechanism (not shown).

An accelerator operation amount Acc that is the operation amount of the accelerator pedal 30 and a vehicle speed V of the hybrid vehicle 100, measured by the vehicle speed sensor 29, are further input to the ECU 25. The ECU 25 controls the traveling of the hybrid vehicle 100 in response to the selected shift range, the accelerator operation amount Acc and the operation amount of a brake pedal (not shown). For example, when a traveling load is small and the efficiency of the engine 2 is low as in the case where the hybrid vehicle 100 is stopped or the hybrid vehicle 100 is traveling at a low speed, the ECU 25 controls the electric power converter 19 such that the hybrid vehicle 100 stops the engine 2 and travels by using only the motor generator 10 (EV mode). On the other hand, when the traveling load increases and the engine 2 is operated efficiently, the ECU 25 controls the engine 2 and the electric power converters 18, 19 such that the hybrid vehicle 100 starts the engine 2 and travels by using the engine 2 and the motor generator 10 (HV mode).

When the hybrid vehicle 100 decelerates as a result of operation of the brake pedal, the ECU 25 controls the electric power converter 19 such that regenerative braking force is obtained by outputting negative torque from the motor generator 10. Regenerated electric power resulting from generation of negative torque may be converted to direct-current power by the electric power converter 19 and then may be used to charge the secondary battery 16.

In this way, the hybrid vehicle 100 travels while the secondary battery 16 is charged or discharged. The state of charge of the secondary battery 16 is indicated by an SOC that indicates a present amount of electric charge to a full charge state by percentage. The SOC is calculated based on detected values of the sensor unit 17. Because the hybrid vehicle 100 includes the above-described power generation mechanism, the SOC of the secondary battery 16 is allowed to be controlled during traveling (in HV mode). Hereinafter, control over the SOC of the secondary battery 16 in the hybrid vehicle 100 according to the present embodiment will be described in detail.

Figure 2:
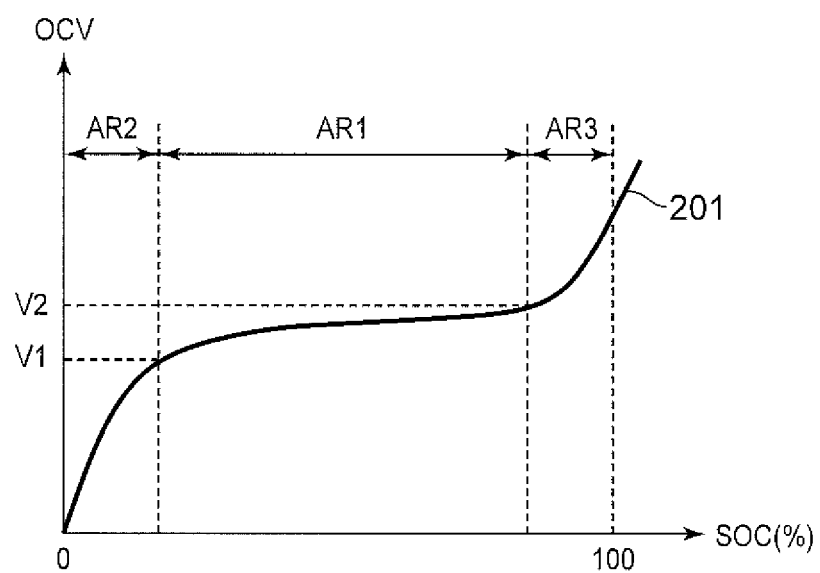
FIG. 2 is a conceptual graph that illustrates the characteristics of a secondary battery mounted on the hybrid vehicle according to the embodiment.

FIG. 2 is a conceptual view that illustrates the characteristics (SOC-voltage characteristics) of the secondary battery mounted on the hybrid vehicle 100 according to the present embodiment. FIG. 2 shows a characteristic curve 201 that plots the correspondence relationship between the SOC and voltage (open circuit voltage (OCV)) of the secondary battery 16 shown in FIG. 1.

Referring to FIG. 2, the secondary battery 16 has such a characteristic that a voltage variation is large with respect to an SOC variation in a low voltage range (AR2) and in a high voltage range (AR3); whereas a voltage variation is small with respect to an SOC variation in an intermediate voltage range (AR1). Such battery characteristics appear remarkably in, for example, a nickel-metal hydride secondary battery.

The intermediate voltage range AR1, the low voltage range AR2 and the high voltage range AR3 are distinguished from one another based on the battery voltage (OCV). For example, the secondary battery 16 falls within the high voltage range AR3 when OCV>V2, and the secondary battery 16 falls within the low voltage range AR2 when OCV<V1. On the other hand, when the OCV falls within the range of V1 to V2, the secondary battery 16 falls within the intermediate voltage range AR1. The voltages V1, V2 may be determined in advance in accordance with the characteristics of each secondary battery.

Usually, charging and discharging of the secondary battery 16 mounted on the hybrid vehicle 100 are controlled such that the SOC is kept within the range of about 50 to 60% in order to ensure an allowance for recovering regenerative energy. Therefore, the secondary battery 16 is usually used in the intermediate voltage range AR1. For this reason, it is difficult to calculate the SOC of the secondary battery 16 based on the battery voltage Vb. Therefore, during vehicle traveling, the SOC of the secondary battery 16 is basically calculated based on an integrated value of the battery current Ib.

Figure 3:
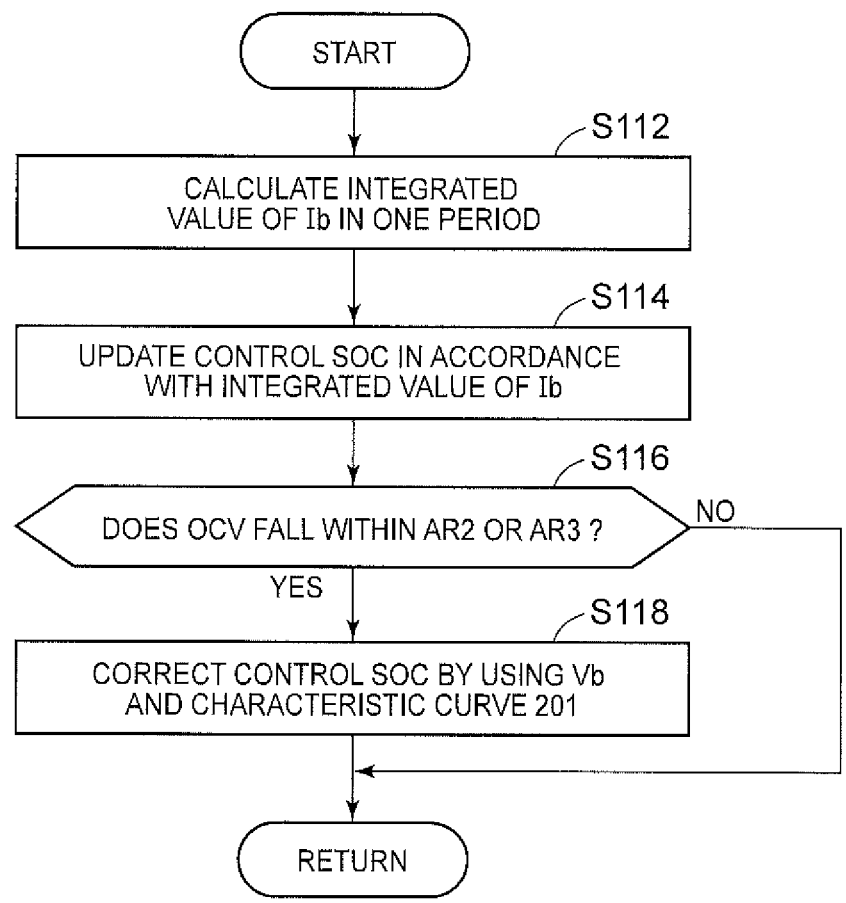
FIG. 3 is a flowchart that illustrates the process of calculating a control SOC.

FIG. 3 is a flowchart for illustrating the process of calculating a control SOC. Referring to FIG. 3, the ECU 25 calculates an integrated value of the battery current Ib in one period in step S112. In step S114, the ECU 25 updates the control SOC in accordance with an SOC variation based on the integrated current value calculated in step S112. Specifically, a control SOC in the current control period is calculated from the sum of the control SOC in the last control period and the SOC variation.

In step S116, the ECU 25 determines whether the OCV falls within the low voltage range AR2 or the high voltage range AR3 based on the battery voltage Vb. When the OCV falls within the low voltage range AR2 or the high voltage range AR3, the ECU 25 corrects the control SOC based on the OCV in accordance with the characteristic curve 201 (FIG. 2) in step S118. That is, in an area in which the OCV variation is large with respect to the SOC variation, it is possible to improve the accuracy of the control SOC by correcting the calculated value of the control SOC based on the integrated current value based on the OCV.

On the other hand, when the OCV does not fall within the low voltage range AR2 or the high voltage range AR3 (when negative determination is made in S116), the ECU 25 skips the process of step S116. Thus, the calculated value based on the integrated current value, calculated in step S114, is directly used as the control SOC.

As described above, usually, the secondary battery 16 is used within the intermediate voltage range AR1, so the hybrid vehicle 100 is able to calculate the control SOC based on the integrated value of the battery current Ib.

On the other hand, for example, at the time of maintenance work at a service center, or the like, it is possible to calculate the SOC based on the battery voltage Vb by discharging or charging the secondary battery 16 until the SOC reaches the low voltage range AR2 or the high voltage range AR3 under sufficient management. Therefore, when the OCV falls within the low voltage range AR2 or the high voltage range AR3 (when affirmative determination is made in S116), the ECU 25 calculates the control SOC by using the battery voltage Vb and the characteristic curve 201 in step S118. Thus, it is possible to correct the control SOC based on the integrated current value.

Figure 4:
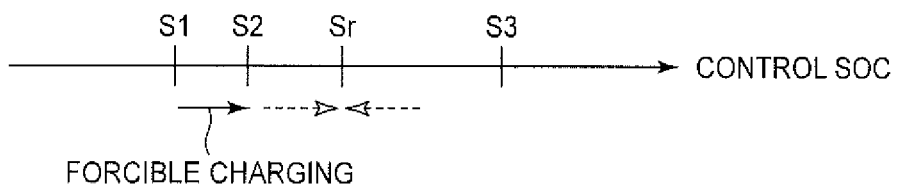
FIG. 4 is a conceptual view for illustrating the outline of SOC control over the secondary battery of the hybrid vehicle.

FIG. 4 is a conceptual view for illustrating SOC control over the secondary battery 16 in the hybrid vehicle.

Referring to FIG. 4, the SOC of the secondary battery 16 is controlled toward the control SOC as a direct target. For example, if a control target center Sr is set as an SOC control target, charging and discharging of the secondary battery 16 are controlled such that the control SOC is kept near the control target center Sr. For example, SOC control may be executed by adjusting the power of the engine 2 such that a charging electric power for SOC control is added or a discharging electric power for SOC control is reduced with reference to a power required to propel the vehicle. In the following description, the control target center Sr (for example, about 50%) that is a single SOC value is set as the control target; instead, the control target may be set as an SOC range having a certain width.

In order to avoid overdischarging and overcharging of the secondary battery 16, SOC control is executed such that the control SOC does not fall outside a predetermined control range (the range of a control lower limit S1 to a control upper limit S3).

As the control SOC decreases to the control lower limit S1, forcible charging is performed by operating the engine 2. During forcible charging, even when the operation of the engine 2 is originally not required, for example, when the required vehicle driving force is small or when the hybrid vehicle 100 is stopped, the engine 2 is forcibly operated in order to generate electric power for charging the secondary battery 16. Forcible charging is continued until the control SOC reaches S2. As the control SOC increases to S2, forcible charging is ended.

On the other hand, as the control SOC reaches the control upper limit S3, charging of the secondary battery 16 is prohibited. In this case, not only power generation with the use of the power generation mechanism, that is, power generation using the power of the engine 2, but also regenerative power generation is prohibited. In this case, vehicle braking force is secured by a disc brake mechanism (not shown).

Through such output control including switching between operation and stop of the engine 2, SOC control is executed by controlling electric power generated by the power generation mechanism.

Figure 5:
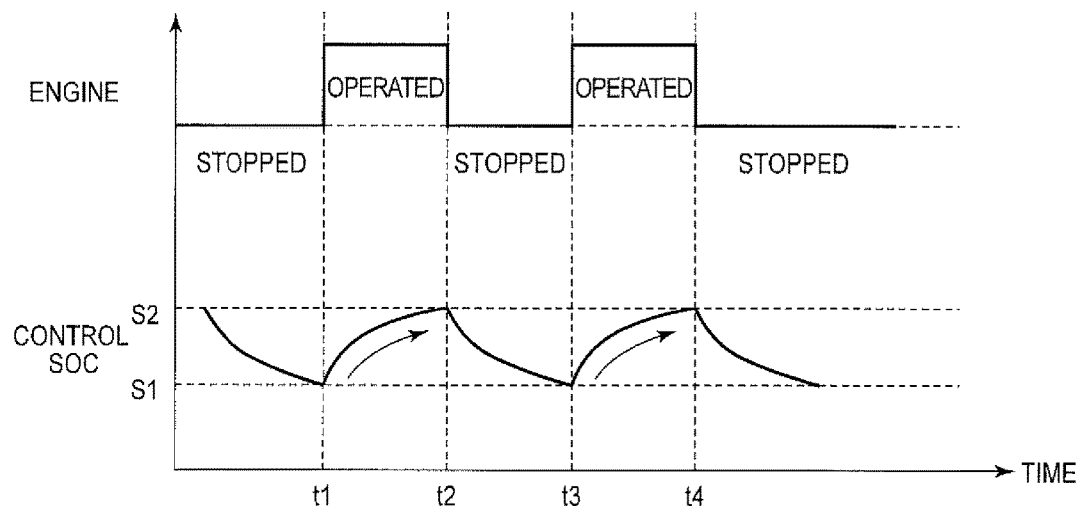
FIG. 5 is an example of an operation waveform in the case where forcible charging is repeatedly performed in the hybrid vehicle according to the embodiment.

For example, if the auxiliary load 45 is operated in the case where the hybrid vehicle 100 is left standing in the P range as a result of long-time parking, forcible charging is repeatedly performed in the SOC range near the control lower limit S1 as shown in FIG. 5.

FIG. 5 is an example of an operation waveform in the case where forcible charging is repeatedly performed in the hybrid vehicle according to the present embodiment.

Referring to FIG. 5, as the control SOC decreases to the control lower limit S1 at time t1 as a result of consumption of electric power in the auxiliary load 45, the engine 2 is operated, and forcible charging is started. Thus, the control SOC increases, and reaches S2 at time t2. Thus, at time t2, forcible charging is ended, and the engine 2 is stopped.

The control SOC decreases again after time t2, so forcible charging is performed again from time t3 to time t4. In this way, as a similar vehicle condition continues, intermittent forcible charging is further repeatedly performed. Thus, the SOC of the secondary battery 16 remains in the range in which the control SOC falls within the range of S1 to S2.

Figure 6:
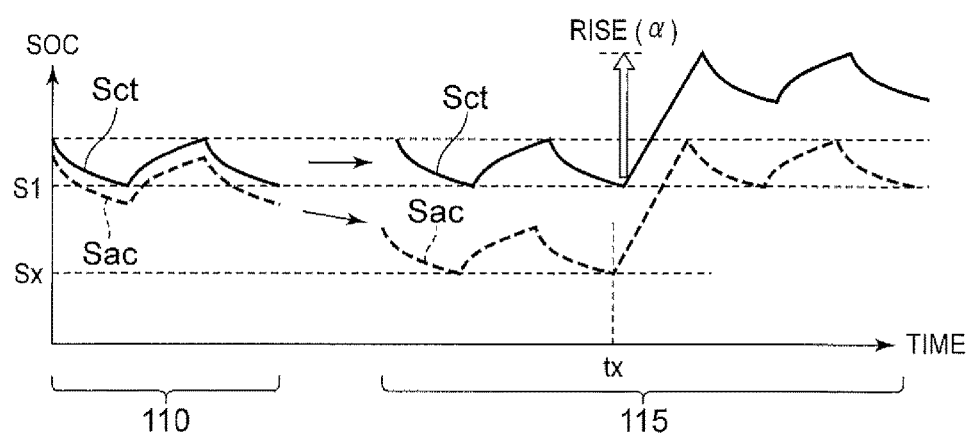
FIG. 6 is a graph for illustrating changes in actual SOC of the secondary battery.

FIG. 6 shows a graph for illustrating changes in the actual SOC (hereinafter, also referred to as actual SOC) of the secondary battery 16.

Referring to FIG. 6, it is known that, in a nickel-metal hydride battery, the SOC actually decreases due to self-discharge in a period during which there is no battery current Ib. That is, a decrease in SOC due to self-discharge does not appear in the control SOC that is calculated based on the integrated value of the battery current Ib.

Therefore, there is at least a difference due to self-discharge (SOC decrease amount) between the control SOC and the actual SOC. In FIG. 6, the control SOC (Sct) is indicated by the continuous line, and the actual SOC (Sac) is indicated by the dashed line.

During the period 110 in FIG. 6, forcible charging of the secondary battery 16 is repeatedly performed in a state where the difference between the control SOC and the actual SOC is relatively small. It is understood that the actual SOC is controlled so as not to remain in a low SOC range below the control lower limit S1 by the use of forcible charging that keeps the control SOC above the control lower limit S1.

In contrast, during the period 115, because of an increase in the SOC decrease amount due to the influence of self-discharge, forcible charging of the secondary battery 16 is repeatedly performed in a state where the difference between the actual SOC and the control SOC is large.

During the period 115, even when forcible charging is performed such that the control SOC does not become lower than the control lower limit S1, the actual SOC remains in the low SOC range below the control lower limit S1. If there occurs a phenomenon that the secondary battery 16 is repeatedly charged and discharged in such a low SOC range, there is a concern that the full charge capacity of the secondary battery 16 decreases due to a so-called charge memory effect.

The control lower limit S1 in SOC control is provided in such an SOC range that the charge memory effect (described later) does not occur even when charging and discharging are repeatedly performed. Therefore, when retention of the actual SOC in a range lower than the control lower limit S1 is avoided by forcible charging, it is possible to prevent occurrence of the memory effect. Generally, the control lower limit S1 is located within the intermediate voltage range AR1 on a side close to the low voltage range AR2 in FIG. 2.

Figure 7A:
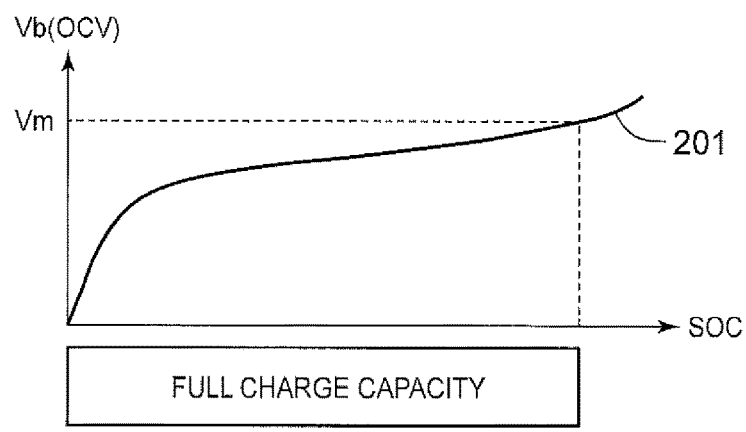
FIG. 7A and FIG. 7B are conceptual graphs that illustrate a decrease in full charge capacity due to a charge memory effect of the secondary battery.
Figure 7B:
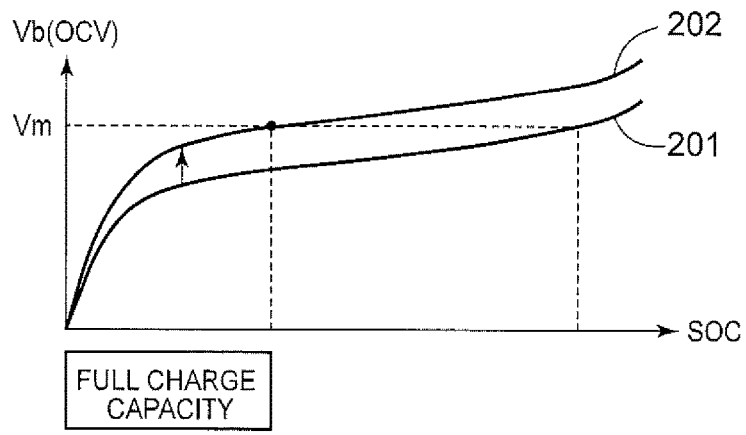

FIG. 7A and FIG. 7B are conceptual views that illustrate a decrease in full charge capacity due to the charge memory effect of the secondary battery. FIG. 7A shows the characteristic curve 201 of the secondary battery 16 when the secondary battery 16 has not degraded (new). The characteristic curve 201 is similar to that shown in FIG. 2. In a state where the battery voltage Vb has reached a voltage Vm, the secondary battery 16 becomes a full charge state.

Therefore, in parallel with management of the control SOC based on the integrated value of the battery current Ib, described with reference to FIG. 2, when the battery voltage Vb (or the OCV based on the battery voltage Vb) increases to the voltage Vm (or a voltage close to the voltage Vm), it is recognized that the secondary battery 16 is in an overcharging state. In this case, as in the case where the control SOC increases to the control upper limit S3, described with reference to FIG. 4, further charging of the secondary battery 16 is prohibited.

On the other hand, FIG. 7B shows the characteristic curve 202 at the time when there is the charge memory effect of the secondary battery 16 as a result of repetition of charging and discharging in the low SOC range as compared to the characteristic curve 201 when the secondary battery 16 has not degraded.

Referring to FIG. 7B, when there occurs a charge memory effect as a result of retention of the SOC in the low SOC range, the battery voltage (OCV) for the SOC is shifted to a high voltage side from the low SOC range in the characteristic curve 202 as compared to the characteristic curve 201.

As a result, in a range in which the SOC has not reached the original full charge state (100%), the battery voltage Vb (or the OCV) increases to the voltage Vm shown in FIG. 7A. As a result, further charging of the secondary battery 16 is prohibited, so it is understood that an equivalent full charge capacity significantly decreases. Thus, there is a concern about a significant decrease in the usage efficiency of the secondary battery 16.

Therefore, in the hybrid vehicle according to the embodiment, SOC control over the secondary battery 16 is executed such that occurrence of the charge memory effect is prevented based on calculating an estimated actual SOC that reflects at least the SOC decrease amount due to self-discharge.

Figure 8:
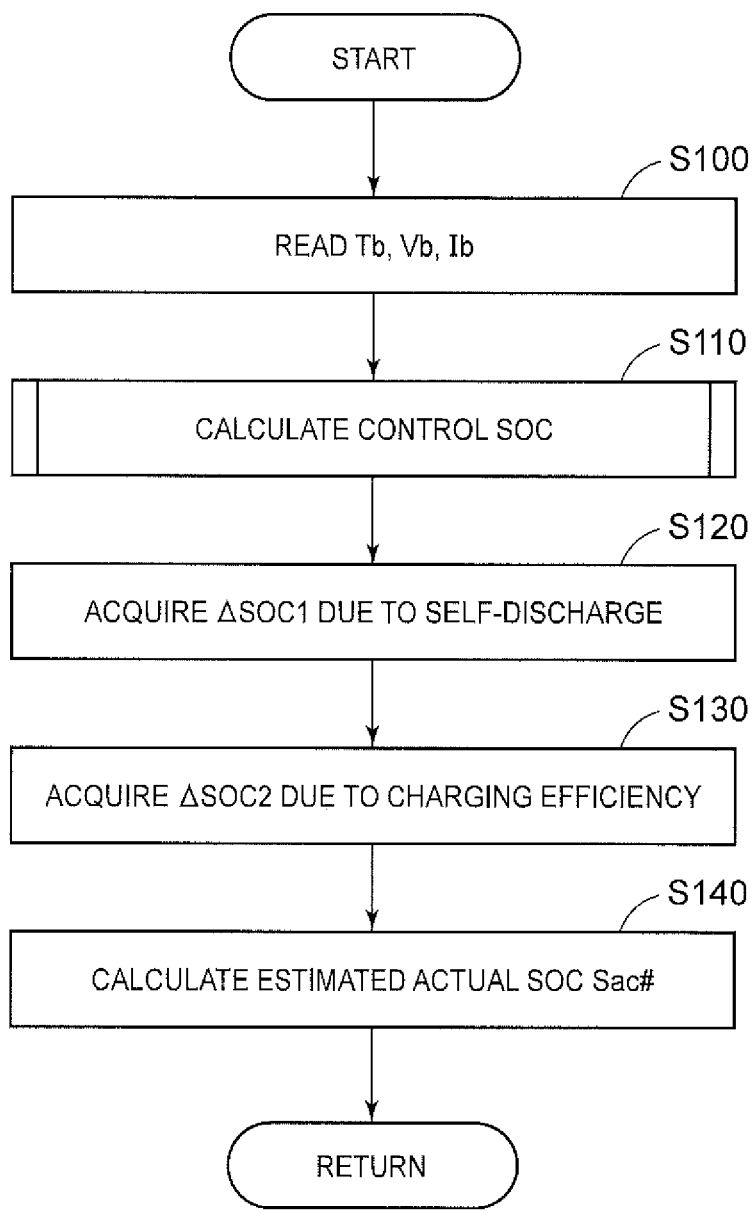
FIG. 8 is a flowchart that illustrates the process of estimating an actual SOC of the secondary battery in the hybrid vehicle according to the embodiment.

FIG. 8 is a flowchart that illustrates the process of estimating the actual SOC of the secondary battery 16 in the hybrid vehicle according to the present embodiment. The control process shown in FIG. 8 is, for example, repeatedly executed by the ECU 25 at predetermined intervals while the IG switch 38 is in an on state.

Referring to FIG. 8, in step S110, the ECU 25 reads the battery temperature Tb, the battery voltage Vb and the battery current Ib based on the outputs of the sensor unit 17 of the secondary battery 16. The ECU 25 calculates the control SOC in step S110. In step S110, the control SOC in the current control period is calculated through the processes of step S112 to step S118, shown in FIG. 3.

As the control SOC is calculated (S110), the ECU 25 acquires $\Delta SOC1$ that is an SOC decrease amount due to self-discharge of the secondary battery 16 in step S120. The ECU 25 acquires $\Delta SOC2$ that is an SOC decrease amount that reflects the charging efficiency in step S130.

In step S140, the ECU 25 calculates an estimated value Sac# of the actual SOC based on the control SOC calculated in step S110, the SOC decrease amount $\Delta SOC1$ read in step S120, and the SOC decrease amount $\Delta SOC2$ read in step S130. That is, the estimated value Sac# of the actual SOC is obtained by using the mathematical expression Sac#=Sct−($\Delta SOC1+\Delta SOC2$).

In the present embodiment, the actual SOC is estimated in consideration of both the SOC decrease amount due to self-discharge ($\Delta SOC1$) and the SOC decrease amount that reflects the charging efficiency ($\Delta SOC2$). Instead, the actual SOC may be estimated in consideration of only the SOC decrease amount due to self-discharge. That is, in the present embodiment, the estimated value Sac# of the actual SOC is calculated based on the integrated current value of the secondary battery 16, reflected in the control SOC, and at least the SOC decrease amount due to self-discharge ($\Delta SOC1$).

Next, a specific example of the process of calculating the SOC decrease amounts ($\Delta SOC1$, $\Delta SOC2$) will be described in detail with reference to FIG. 9 to FIG. 11.

Figure 9:
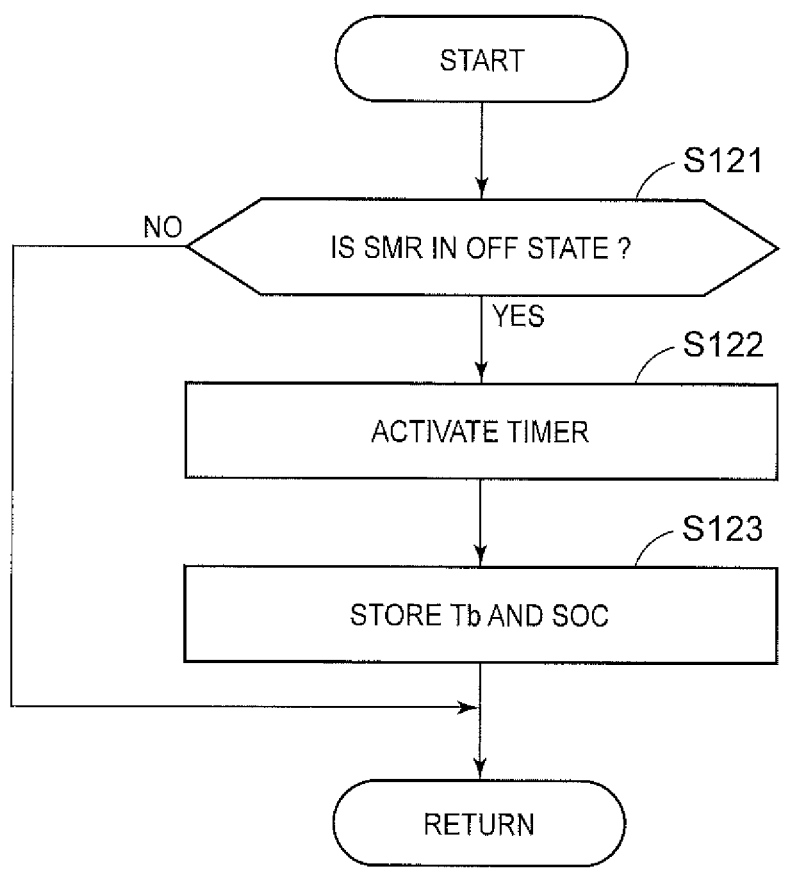
FIG. 9 is a first flowchart that illustrates the process of calculating an SOC decrease amount due to self-discharge.
Figure 10:
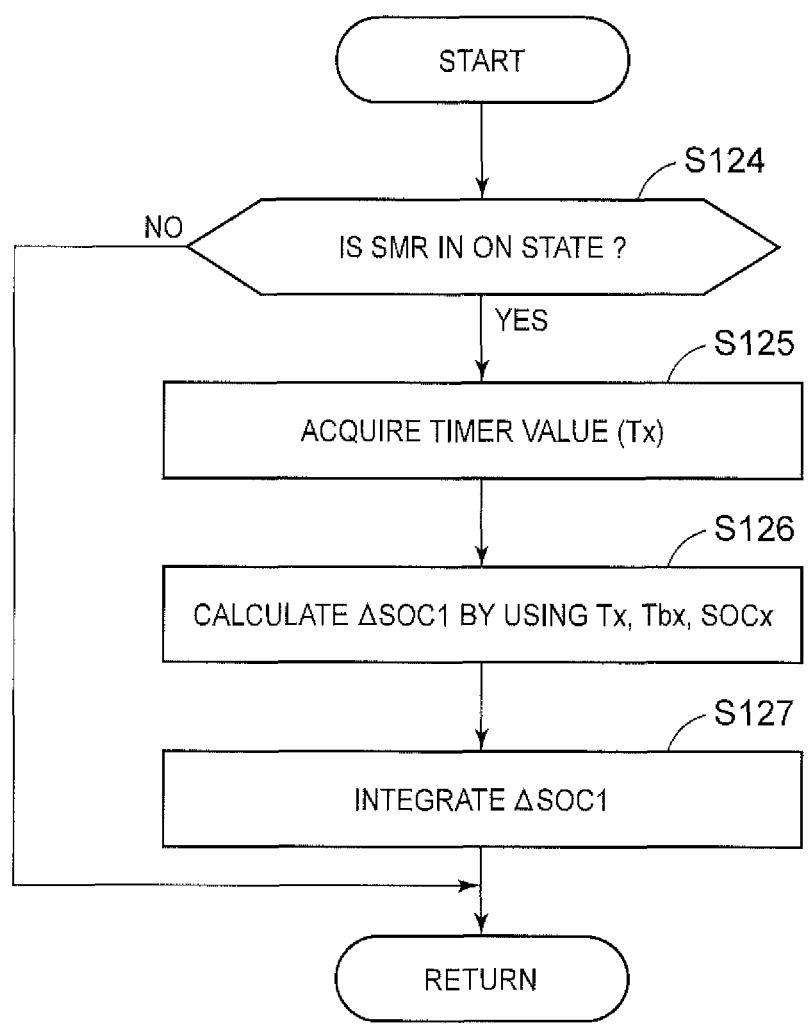
FIG. 10 is a second flowchart that illustrates the process of calculating an SOC decrease amount due to self-discharge.

FIG. 9 and FIG. 10 are flowcharts that illustrate a control process for calculating the SOC decrease amount due to self-discharge ($\Delta SOC1$).

Referring to FIG. 9, when the SMR 20 is in the off state (when affirmative determination is made in S121), the ECU 25 activates the timer 26 in step S122 in order to measure a non-use time (that is, standing time) of the secondary battery 16. In step S123, the ECU 25 stores the SOC (for example, the control SOC) and the battery temperature Tb at the time when the SMR 20 is turned off.

On the other hand, other than the time when the SMR 20 is in the off state (when negative determination is made in S121), the processes of step S122 and step S123 are not executed. At this time, the time measured by the timer 26 is cleared.

Referring to FIG. 10, when the SMR 20 is in the on state (when affirmative determination is made in S124), the ECU 25 acquires a timer value Tx measured by the timer 26 in step S125. The timer value Tx is a value corresponding to an elapsed time from the time when step S122 of FIG. 9 is executed.

Self-discharge of the secondary battery 16 occurs during non-use of the secondary battery 16, that is, the period during which the SMR 20 is in the off state in the hybrid vehicle 100. The SOC decrease amount due to self-discharge changes depending on the battery temperature Tbx, SOC level (SOCx) and standing time during non-use. The timer value Tx acquired in step S125 corresponds to the non-use time (standing time) of the secondary battery 16, which corresponds to a self-discharge period.

Therefore, a map for calculating the SOC decrease amount due to self-discharge ($\Delta SOC1$) based on the battery temperature Tbx, the SOC level (SOCx) and the standing time (Tx) is allowed to be created in advance by prior actual machine test, or the like.

In step S126, the ECU 25 calculates the SOC decrease amount ($\Delta SOC1$) during one period of standing based on the standing time Tx of the secondary battery 16 and the battery temperature Tbx and SOC level (SOCx) during standing by using the above-described map created in advance.

Because the control SOC does not change during standing, the control SOC stored in step S123 (FIG. 9) may be used as SOCx. The battery temperature Tb stored in step S123 (FIG. 9) may be used as the battery temperature Tbx. Alternatively, the battery temperature Tbx may be obtained from the average of the battery temperature Tb at the time of step S126 and the battery temperature Tb at the time of step S123.

In this way, the SOC decrease amount due to self-discharge ($\Delta SOC1$) during one standing period from the time when the SMR 20 is turned off to the time when the SMR 20 is turned on next time is obtained.

In step S127, the ECU 25 updates the SOC decrease amount ($\Delta SOC1$) by adding $\Delta SOC1$ calculated in step S126 to the integrated value so far. $\Delta SOC1$ is allowed to be cleared ($\Delta SOC1=0$) in response to the fact that the battery voltage falls within the low voltage range AR2 or the high voltage range AR3 and the control SOC is corrected (S118 in FIG. 3). On the other hand, before $\Delta SOC1$ is cleared, $\Delta SOC1$ is sequentially integrated each time the secondary battery 16 is charged. In step S120 of FIG. 8, the integrated value of $\Delta SOC1$ at that time is read out.

Figure 11:
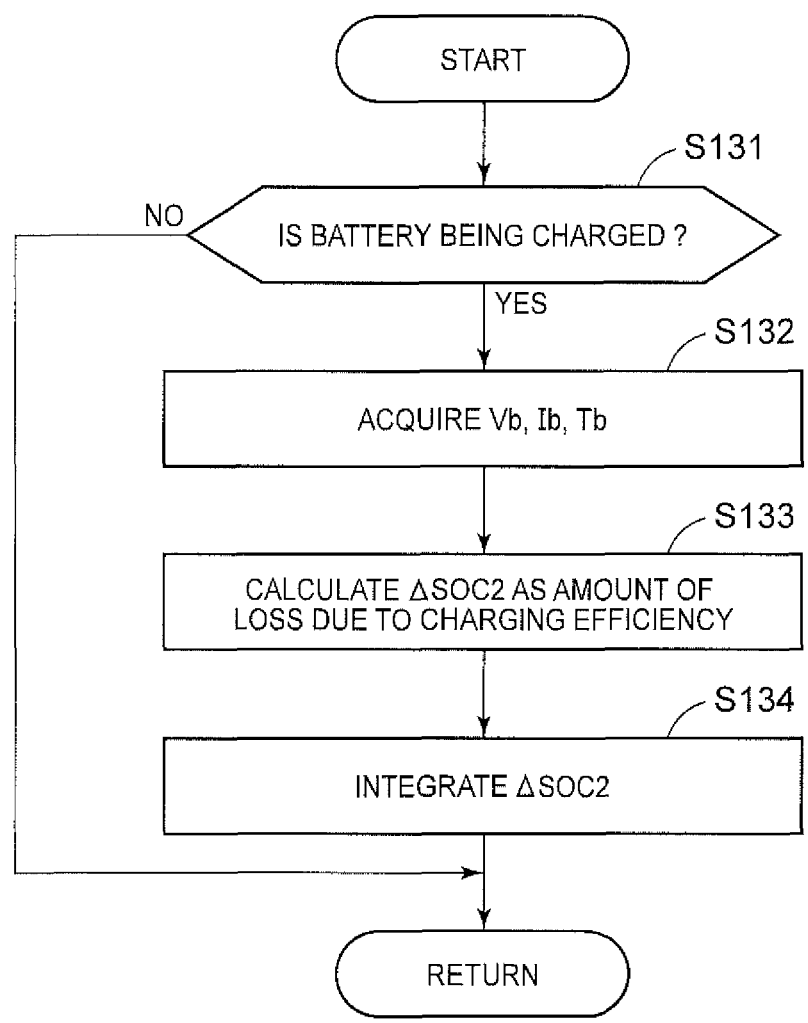
FIG. 11 is a flowchart that illustrates the process of calculating an SOC decrease amount that reflects a charging efficiency.

FIG. 11 is a flowchart that illustrates the process of calculating the SOC decrease amount that reflects the charging efficiency.

Referring to FIG. 11, the ECU 25 determines in step S131 whether the secondary battery 16 is being charged. When the secondary battery 16 is being charged (when affirmative determination is made in S131), the process proceeds to step S132. In step S132, the battery voltage Vb, battery current Ib and battery temperature Tb of the secondary battery 16 during charging are acquired based on the outputs of the sensor unit 17.

The ECU 25 causes the process to proceed to step S133, and calculates the SOC decrease amount ΔSOC2 that corresponds to the loss of charging electric power and that reflects the charging efficiency based on the battery voltage Vb, the battery current Ib and the battery temperature Tb.

Ideally, the charging efficiency is 1.0 when all the charging current is used in electrochemical reaction for storing electric power; however, actually, part of current is used in side reaction that leads to, for example, production of internal gas, with the result that the charging efficiency becomes lower than 1.0. It is known that the charging efficiency changes in response to the battery temperature Tb and the SOC. Therefore, a map of the charging efficiency for the battery temperature Tb and the SOC is allowed to be created in advance by prior actual machine test, or the like.

As the charging efficiency decreases from 1.0, not all the electric power (Vb×Ib) input to the secondary battery 16 contributes to an increase in actual SOC. On the other hand, an increase in control SOC resulting from charging is calculated based on the battery voltage Vb and the battery current Ib. Therefore, during charging, a difference occurs between the actual SOC and the control SOC in response to the amount of loss of charging electric power. ΔSOC2 indicates the above-described difference that occurs each time of charging.

For example, in step S133, ΔSOC2 in each control period is allowed to be calculated based on at least one of the control SOC and the charging efficiency acquired by using the map based on the battery temperature Tb, and the charging electric power (the battery voltage Vb and the battery current Ib).

In step S134, the ECU 25 updates the SOC decrease amount (ΔSOC2) by adding ΔSOC2 calculated in step S133 to the last integrated value of ΔSOC2. ΔSOC2, as well as ΔSOC1, is allowed to be cleared (ΔSOC2=0) in response to the fact that the battery voltage falls within the low voltage range AR2 or the high voltage range AR3 and the control SOC is corrected (S118 in FIG. 3). As for ΔSOC2 as well, before ΔSOC2 is cleared, ΔSOC2 is sequentially integrated each time the secondary battery 16 is charged. In step S130 of FIG. 8, the integrated value of ΔSOC2 at that time is read out.

FIG. 11 illustrates the process of integrating ΔSOC2 in each control period during charging. Instead, the process of calculating and integrating ΔSOC2 may be executed each time of the end of the charging operation by integrating the battery current Ib each single charging operation and using the integrated value of the battery current Ib and the battery voltage Vb and battery temperature Tb (charging efficiency) in the charging operation.

Figure 12:
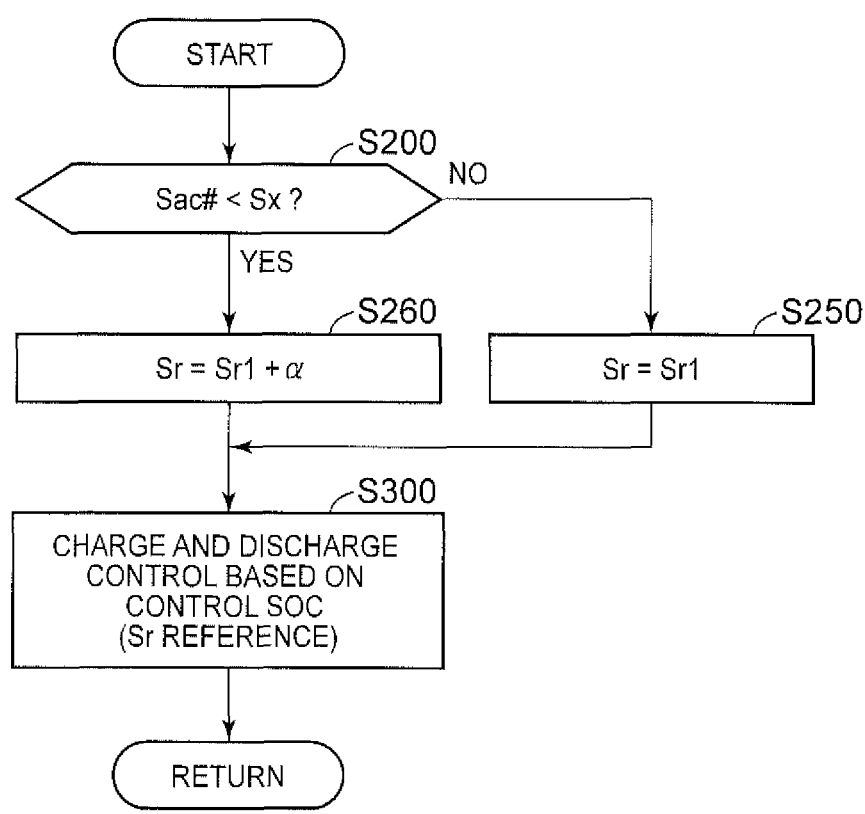
FIG. 12 is a flowchart for illustrating the process of executing SOC control in the hybrid vehicle according to the embodiment.

FIG. 12 is a flowchart for illustrating the process of executing SOC control in the hybrid vehicle according to the present embodiment. The control process according to FIG. 12 is, for example, repeatedly executed by the ECU 25 at predetermined intervals together with the control process shown in FIG. 8 while the IG switch 38 is in the on state.

Referring to FIG. 12, the ECU 25 determines in step S200 whether the estimated value Sac# of the actual SOC, obtained in step S140 of FIG. 8, has decreased to a lower limit SOC (Sx).

When Sac# has not decreased to the lower limit SOC (Sx) (when negative determination is made in S200), the ECU 25 sets the control target center Sr (FIG. 4) of SOC control to a default value Sr1 in step S250.

On the other hand, when the estimated value Sac# of the actual SOC has decreased below the lower limit SOC (Sx) (when affirmative determination is made in S200), the ECU 25 causes the process to proceed to step S260, and raises the control target center Sr from the default value (Sr=Sr1+α). Thus, S1 and S2 (FIG. 4) that are the thresholds for forcible charging also increase from the state where Sr=Sr1 (that is, a default state). Similarly, S3 (FIG. 4) that is a threshold for prohibiting charging desirably increases from the state where Sr=Sr1 (that is, the default state).

In step S300, the ECU 25 executes SOC control described with reference to FIG. 4 such that the control SOC calculated in step S120 (FIG. 8) is kept at the control target (control target center Sr) determined in step S250 or step S260.

Referring back to FIG. 6, in the period I15 during which there is a large deviation between the actual SOC and the control SOC, even when the control SOC is controlled so as not to become lower than the control lower limit S1, the actual SOC (Sac) decreases to the lower limit SOC (Sx) at time tx. As a result, at time tx, affirmative determination is made in step S200 (FIG. 12), so the SOC control target is raised by α (S260). For example, where α=S1 (default value)−Sx, the control SOC is allowed to be controlled such that the actual SOC does not decrease below the default value of the control lower limit S1 from time tx. That is, in FIG. 6, the lower limit SOC (Sx) corresponds to a first lower limit SOC, and the control lower limit S1 corresponds to a second lower limit SOC.

As a result, even when the amount of decrease in actual SOC with respect to the control SOC that is the target of SOC control increases, it is possible to avoid retention of the actual SOC in the low SOC range. Thus, it is possible to prevent occurrence of the charge memory effect of the secondary battery 16.

As for the SOC decrease amounts (ΔSOC1, ΔSOC2), the accuracy of estimating an SOC variation decreases as compared to the integrated current value. Therefore, a direct control value (control SOC) in SOC control is obtained based on the integrated current value, while the SOC decrease amounts are reflected in the control target in the SOC control. Thus, it is possible to further stably control the SOC within an appropriate range.

As described above, the SOC decrease amounts ΔSOC1, ΔSOC2 are sequentially integrated before the SOC decrease amounts ΔSOC1, ΔSOC2 are cleared. Therefore, basically, when affirmative determination is once made in step S200 (FIG. 12) and the SOC control target is raised, the affirmative determination is desirably maintained before the SOC decrease amounts are cleared in step S118 (FIG. 3).

Alternatively, as a result of executing SOC control while raising the SOC control target from the default value in order to ensure an allowance for recovering regenerative energy, when the estimated value Sac# of the actual SOC has increased by a certain amount, the SOC control target is allowed to be returned to the default value. For example, while the SOC control target is raised, by setting the lower limit SOC (Sx) in step S200 to a value higher than that when the SOC control target is the default value, it is possible to implement such control.

Alternative Embodiment

Hereinafter, an alternative embodiment of setting the SOC control range will be described.

Figure 13:
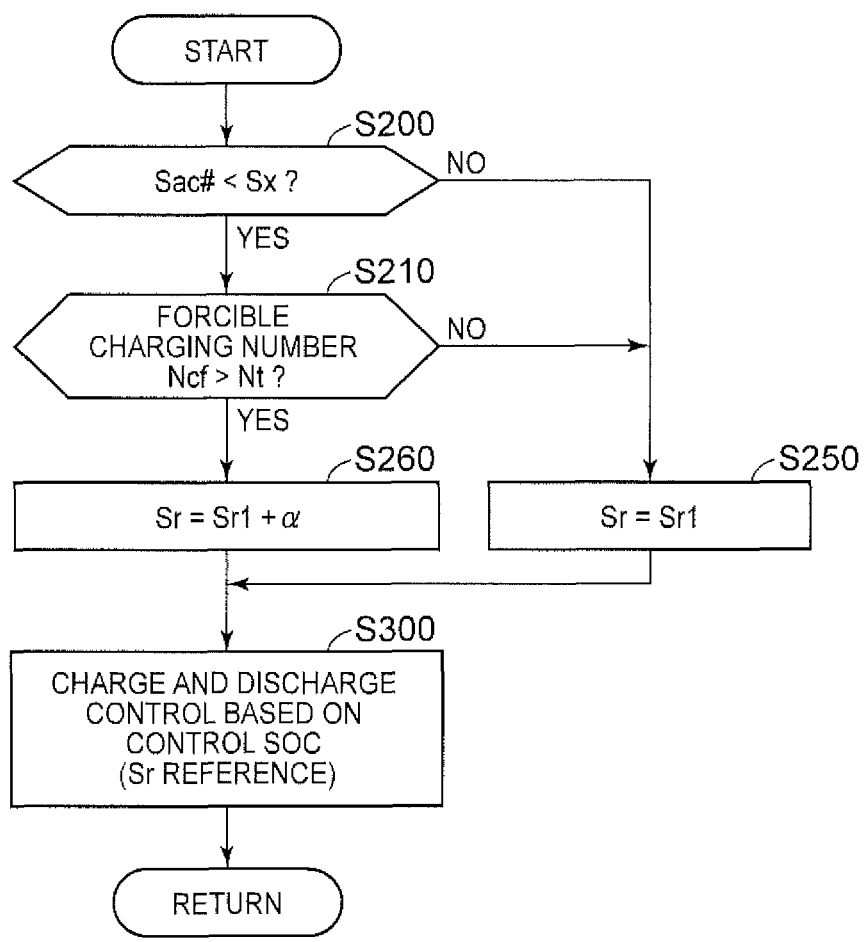
FIG. 13 is a flowchart for illustrating a first alternative embodiment of the process of executing SOC control in the hybrid vehicle according to the embodiment.

FIG. 13 is a flowchart that illustrates a first alternative embodiment of the process of executing SOC control in the hybrid vehicle according to the present embodiment.

By comparing FIG. 13 with FIG. 12, when the estimated value Sac# of the actual SOC has decreased to the lower limit SOC (Sx) (when affirmative determination is made in S200), the ECU 25 further executes step S210.

In step S210, the ECU 25 determines whether the number of times Ncf forcible charging control is executed exceeds a determination value Nt. The forcible charging number Ncf is incremented by one each time forcible charging described with reference to FIG. 4 and FIG. 5 is executed. The forcible charging number Ncf may be, for example, managed as a frequency in units of a set period (a predetermined number of days or a predetermined number of months).

As Sac# decreases to the lower limit SOC (Sx), when the forcible charging number Ncf corresponding to the number of repetitions of charging and discharging exceeds the determination value Nt (when affirmative determination is made in S210), the ECU 25 causes the process to proceed to step S260 as well as that in FIG. 12, and raises the SOC control target (Sr, S1 to S3) from the default value.

On the other hand, when the forcible charging number is small (or the frequency of forcible charging is low) (when negative determination is made in S210) even before Sac# decreases to the lower limit SOC (Sx) (when negative determination is made in S200) or after Sac# has decreased to the lower limit SOC (Sx), the SOC control target (Sr, S1 to S3) is kept at the default value (S250).

Therefore, according to the alternative embodiment shown in FIG. 13, when the number of repetitions of charging and discharging through forcible charging is small even when Sac# has decreased to the lower limit SOC (Sx), it is possible to prohibit raising the SOC control target.

As a result, the SOC control target is not raised before the risk of occurrence of the charge memory effect rises as a result of actual repetitions of charging and discharging in the low SOC range, so it is possible to prevent or reduce a decrease in the energy efficiency of the hybrid vehicle 100 due to a reduction in the amount of regenerated electric power recovered.

Figure 14:
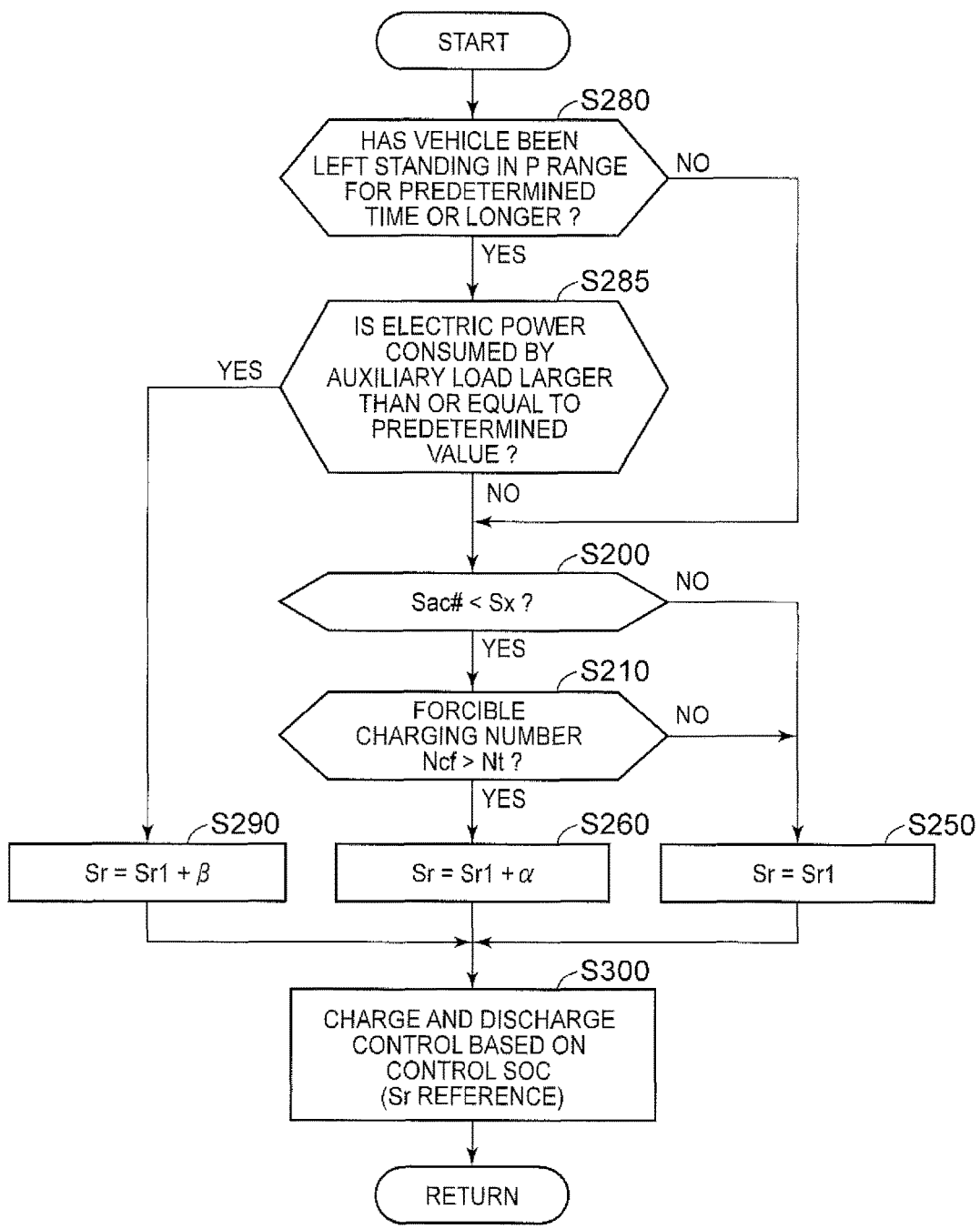
FIG. 14 is a flowchart for illustrating a second alternative embodiment of the process of executing SOC control in the hybrid vehicle according to the embodiment.

FIG. 14 is a flowchart that illustrates a second alternative embodiment of the process of executing SOC control in the hybrid vehicle according to the present embodiment.

By comparing FIG. 14 with FIG. 13, the ECU 25 executes not only the control process shown in FIG. 13 but also step S280 and step S285.

The ECU 25 determines in step S280 whether an elapsed time (standing time) during which the hybrid vehicle 100 is placed in the P range has reached a predetermined time. The standing time in the P range is allowed to be measured by activating the timer 26 of the ECU 25 in response to an output signal of the shift position sensor 36.

When the standing time in the P range has exceeded the predetermined time (affirmative determination is made in S280), the ECU 25 causes the process to proceed to step S285, and determines whether electric power consumed by the auxiliary load 45 is larger than or equal to a predetermined electric power. Determination in step S285 may be carried out based on the operating state (on/off state of each device) of the auxiliary load 45 or may be carried out by actually measuring a consumed electric power.

When the electric power consumed by the auxiliary load 45 is larger than or equal to a predetermined value (when affirmative determination is made in S285), the ECU 25 causes the process to proceed to step S290, and raises the control target center Sr from the default value (Sr=Sr1+β). Thus, the range of S1 to S2 shown in FIG. 4 also increases from the state where Sr=Sr1 (that is, the default state).

When the standing time in the P range exceeds the predetermined time and the electric power consumed by the auxiliary load 45 is larger than or equal to the predetermined value, the vehicle is placed in a state where forcible charging easily repeatedly occurs. Therefore, in this vehicle state, even when the SOC control target is not raised in step S260 (FIG. 12, FIG. 13), the SOC control target is preliminarily raised in step S290. The amount of rise β in step S290 may be the same as the amount of rise in step S260.

When the standing time in the P range has not reached the predetermined time (when negative determination is made in S280) or when the electric power consumed by the auxiliary load 45 is smaller than the predetermined value (when negative determination is made in S285), the ECU 25 executes the processes from step S200 shown in FIG. 13. Alternatively, the process in the case where negative determination is made in step S280 or step S285 may be similar to that of FIG. 12.

Therefore, according to the alternative embodiment shown in FIG. 14, when the vehicle is placed in a state where forcible charging easily repeatedly occurs before the estimated value Sac# of the actual SOC decreases to the lower limit SOC (Sx), it is possible to preliminarily raise the SOC control target. Thus, it is possible to further reliably prevent occurrence of the charge memory effect of the secondary battery 16 due to long-term retention in the low SOC range resulting from repetitions of charging and discharging.

Raising the SOC control target in step S290 is ended when the above-described vehicle state disappears in response to the determination result of step S280 or step S285.

On the other hand, in a period during which the SOC control target has been already raised in step S260, step S290 for preliminarily raising the SOC control target is not required. Therefore, in such a case, step S280 or step S285 is desirably fixed to negative determination.

In the present embodiment, the secondary battery 16 is a nickel-metal hydride battery. Instead, the disclosure is similarly applicable to a secondary battery that tends to have a difference between a control SOC and an actual SOC because of battery characteristics having a voltage range in which a voltage variation is small with respect to an SOC variation as in the case of FIG. 2.

The configuration of the hybrid vehicle 100 shown in FIG. 1 is only illustrative. For example, the disclosure is applicable to various hybrid vehicles having a drive system configuration different from the one illustrated in FIG. 1, such as a series hybrid vehicle in which engine power is exclusively used to generate electric power and a parallel hybrid vehicle, as long as the hybrid vehicles have such a configuration that the SOC is allowed to be controlled by a mechanism (power generation mechanism) that generates electric power for charging the secondary battery during traveling.

The disclosure is also applicable to a so-called plug-in hybrid vehicle of which the secondary battery 16 is externally chargeable through charging outside the vehicle. During external charging, the secondary battery 16 is generally charged to a full charge state, so opportunities to correct an error of the control SOC (with respect to the actual SOC) are relatively easily obtained.

The present embodiment will be summarized. The SOC of a secondary battery is controlled such that a control SOC (Sct) is kept in accordance with a control target. There is a possibility that an actual SOC of the secondary battery decreases below the control SOC because of an SOC decrease amount due to self-discharge, or the like, which cannot be acquired from an integrated current value. As an estimated value (Sac) of the actual SOC, obtained by estimating the SOC decrease amount, decreases to a lower limit SOC (Sx), retention of the actual SOC in a low SOC range is prevented by shifting the control target of SOC control toward a high SOC side.

The embodiment described above is illustrative and not restrictive in all respects. The scope of the disclosure is defined by the appended claims rather than the above description. The scope of the disclosure is intended to encompass all modifications within the scope of the appended claims and equivalents thereof.

What is claimed is:

1. A hybrid vehicle comprising:
   a secondary battery;
   a drive mechanism configured to generate driving force by using electric power from the secondary battery;
   an internal combustion engine;
   a power generation mechanism configured to generate electric power for charging the secondary battery by using power output from the internal combustion engine; and
   an electronic control unit configured to
   a) control operation of the power generation mechanism such that a state of charge of the secondary battery is kept at a predetermined control target,
   b) calculate an estimated actual state of charge of the secondary battery based on an integrated current value and a state of charge decrease amount due to self-discharge of the secondary battery, the integrated current value being obtained by integrating an input current and an output current of the secondary battery, and
   c) when the estimated actual state of charge has decreased below a first lower limit state of charge, raise the predetermined control target.

2. The hybrid vehicle according to claim 1, wherein the electronic control unit is configured to
   d) calculate a control state of charge based on the integrated current value,
   e) when the control state of charge has decreased to a second lower limit state of charge, forcibly charge the secondary battery by operating the power generation mechanism, the second lower limit state of charge being higher than the first lower limit state of charge, and
   f) when the estimated actual state of charge has decreased below the first lower limit state of charge, and a number of times that the secondary battery has been forcibly charged is smaller than a predetermined number of times, prohibit raising the predetermined control target.

3. The hybrid vehicle according to claim 1, further comprising an auxiliary load, wherein
   the electronic control unit is configured to
   g) when the hybrid vehicle has been left standing in a parking range for over a predetermined time and electric power consumed by the auxiliary load is larger than or equal to a predetermined value, raise the control target.

4. The hybrid vehicle according to claim 1, wherein the state of charge decrease amount due to self-discharge of the secondary battery is based on a duration of a time period in which there is no battery current.

5. The hybrid vehicle according to claim 1, wherein the state of charge decrease amount due to self-discharge of the secondary battery is based on a duration of a non-use time of the secondary battery.

* * * * *